(12) United States Patent
Lee et al.

(10) Patent No.: US 7,650,598 B2
(45) Date of Patent: Jan. 19, 2010

(54) METHOD FOR ALLOCATING REGISTERS FOR A PROCESSOR

(75) Inventors: Jenq Kuen Lee, Tainan (TW); Yung Chia Lin, Taipei (TW); Yi Ping Yu, Wu Rih Township, Taichung County (TW)

(73) Assignee: National Tsing Hua University, Hsinchu (TW)

( * ) Notice: Subject to any disclaimer, the term of this patent is extended or adjusted under 35 U.S.C. 154(b) by 752 days.

(21) Appl. No.: 11/463,538

(22) Filed: Aug. 9, 2006

(65) Prior Publication Data

US 2008/0052694 A1 Feb. 28, 2008

(51) Int. Cl.
*G06F 12/00* (2006.01)
(52) U.S. Cl. .................. 717/144; 717/151; 717/156; 717/157
(58) Field of Classification Search .......... 717/144, 717/151, 156, 157; 711/109
See application file for complete search history.

(56) References Cited

U.S. PATENT DOCUMENTS

| | | | |
|---|---|---|---|
| 4,571,678 A | 2/1986 | Chaitin | |
| 5,367,696 A * | 11/1994 | Abe | 717/153 |
| 5,890,000 A * | 3/1999 | Aizikowitz et al. | 717/154 |
| 5,901,317 A * | 5/1999 | Goebel | 717/156 |
| 5,946,491 A * | 8/1999 | Aizikowitz et al. | 717/158 |
| 6,009,272 A * | 12/1999 | Goebel | 717/152 |
| 6,090,156 A * | 7/2000 | MacLeod | 717/157 |
| 6,139,200 A * | 10/2000 | Goebel | 717/159 |
| 6,523,173 B1 * | 2/2003 | Bergner et al. | 717/152 |
| 7,069,548 B2 * | 6/2006 | Kushlis | 717/156 |
| 7,086,045 B2 * | 8/2006 | Park | 717/151 |
| 7,305,665 B2 * | 12/2007 | Koseki et al. | 717/140 |
| 7,386,843 B2 * | 6/2008 | Tarditi | 717/151 |
| 7,469,404 B2 * | 12/2008 | Zhang et al. | 717/156 |

OTHER PUBLICATIONS

G. J. Chaitin, "Register Allocation & Spilling Via Graph Coloring", IBM Research, ACM 0-89791-074-5/82/006/0098, 1982, pp. 98-105, IBM Research, Yorktown Heights, NY.

* cited by examiner

*Primary Examiner*—Thomas K Pham
(74) *Attorney, Agent, or Firm*—Egbert Law Offices PLLC

(57) ABSTRACT

A method of allocating registers for a PAC processor. The PAC processor has a first cluster and a second cluster. Each cluster includes a first functional unit, a second functional unit, a first local register file connected to the first functional unit, a second local register file connected to the second register file, and a global register file having a ping-pong structure formed by a first register bank and a second register bank. After building a Component/Register Type Associated Data Dependency Graph (CRTA-DDG), a functional unit assignment, register file assignment, ping-pong register bank assignment, and cluster assignment of the invention are performed to take full advantage of the properties of a PAC processor.

14 Claims, 15 Drawing Sheets

① : first register bank
② : second register bank
③ : local register file

Ma : first cluster
Ia : first cluster
Mb : second cluster
Ib : second cluster

METHOD FOR ALLOCATING REGISTERS FOR A PROCESSOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method for allocating registers for a processor, and more particularly, to a method for allocating registers for a Parallel Architecture Core (PAC) processor.

BACKGROUND OF THE INVENTION

Most computers contain a form of high-performance data-storage elements called registers, which need to be used effectively to achieve high performance at runtime. The process of choosing language elements to allocate instructions to registers and the data movement required to use them is called "register allocation." Register allocation has a major impact on the ultimate quality and performance of codes. A poor allocation can degrade both code size and runtime performance. However, finding a truly optimal solution has been proven to be computationally intractable. Several general approaches for register allocation have been proposed. For example, register allocation by graph coloring was described by Chaitin, et al. in Computer Languages, Vol. 6, pp 47-57, and in U.S. Pat. No. 4,571,678, titled "Register Allocation and Spilling via Graph Coloring."

While there are register allocation algorithms for finding good solutions in the prior art, they cannot directly apply to the machine that utilizes multiple register files and complex access constraints because the code insertion/replacement is required in the register allocation to validate the code with the allocated registers. This impacts the complexity of register allocation problems in the machine.

BRIEF SUMMARY OF THE INVENTION

The objective of the present invention is to provide a method for allocating registers for a PAC processor with multiple register files and access constraints.

The PAC processor comprises a first cluster and a second cluster. Each cluster comprises a first functional unit, a second functional unit, a first local register file connected to the first functional unit, a second local register file connected to the second functional unit, and a global register file having a ping-pong structure formed by a first register bank and a second register bank. The global register file comprises a single set of access ports shared by the first and second functional units.

The method for allocating registers comprises steps (a)-(e). In step (a), a Component/Register Type Associated Data Dependency Graph (CRTA-DDG) comprising nodes, circles, and edges is built, wherein each node represents an operator, each circle represents an operand, the operand is a constant or a virtual register required to be allocated to a physical register in the machine level, and each edge represents a data dependency between two operands. In step (b), a functional unit assignment is performed for unassigned nodes on the CRTA-DDG to determine which function units are assigned to execute the unassigned nodes. In step (c), a register file assignment is performed for unallocated circles on the CRTA-DDG to determine which register files are allocated to the unallocated circles. In step (d), a ping-pong register bank assignment is performed for the circles assigned to global register files in step (c). In step (e), a communication code is inserted to make the operation work in the PAC DSP structure.

In addition, the method could further comprise a step of performing a cluster assignment to partition the nodes on the CRTA-DDG into two groups, assigning one group to the first cluster and the other group to the second cluster.

The advantage of using the CRTA-DDG is that it clarifies the allocation and schedule restrictions for each node with the consideration of complex constraints in the PAC architecture.

The functional unit assignment, the register file assignment, the ping-pong register bank assignment, and the cluster assignment of the invention are performed to take full advantage of the properties of a PAC processor, so as to obtain a good performance of allocating registers.

BRIEF DESCRIPTION OF THE SEVERAL VIEWS OF THE DRAWINGS

The objectives and advantages of the present invention will become apparent upon reading the following description and upon reference to the accompanying drawings.

DETAILED DESCRIPTION OF THE INVENTION

Figure 1:
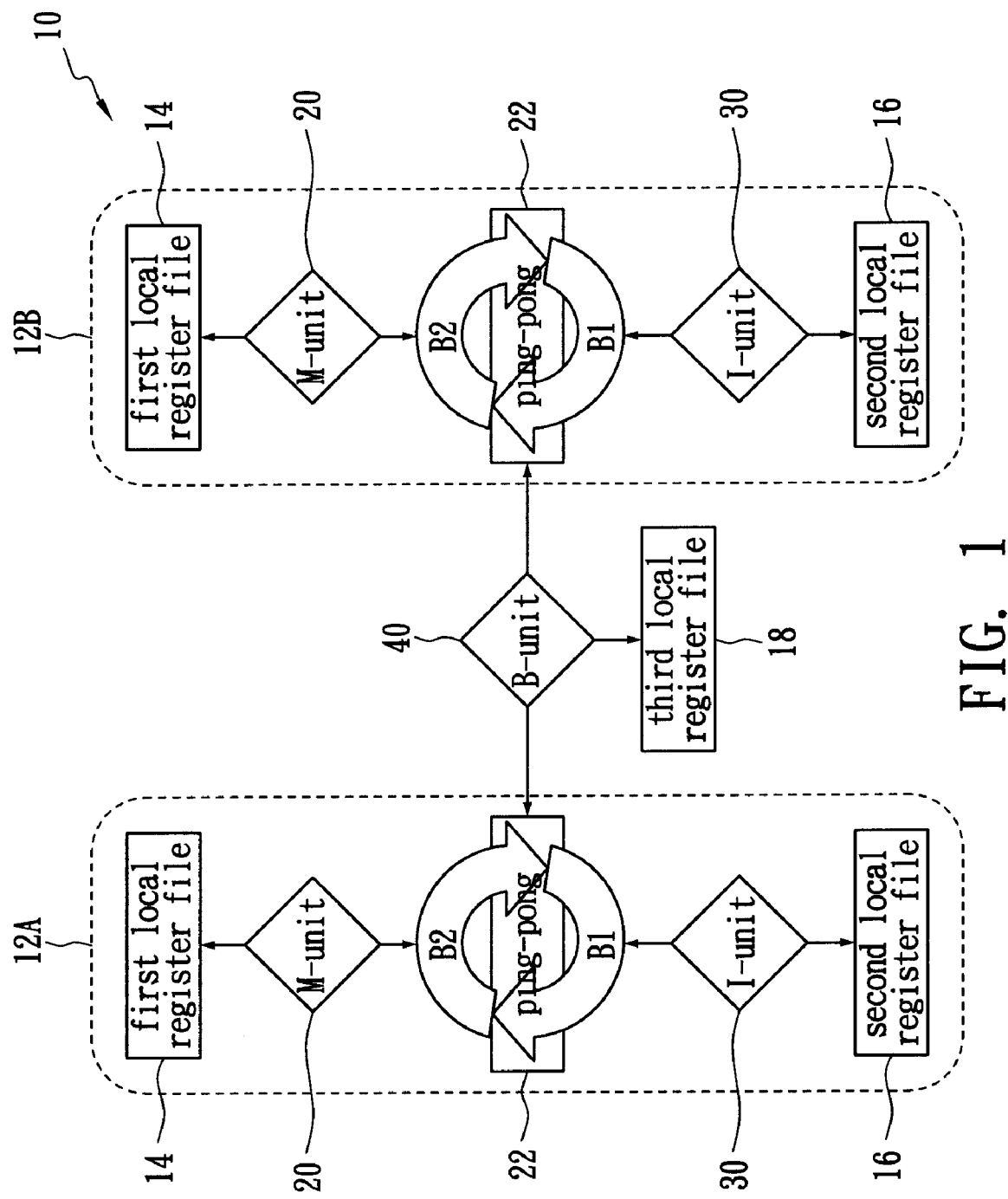
FIG. 1 is a schematic view illustrating the architecture of a PAC processor.

FIG. 1 illustrates the architecture of a Parallel Architecture Core (PAC) processor 10. The PAC processor 10 comprises a first cluster 12A and a second cluster 12B, wherein each cluster 12A or 12B comprises a first functional unit 20, a second functional unit 30, a first local register file 14 connected to the first functional unit 20, a second local register file 16 connected to the second functional unit 30, and a global register file 22 having a ping-pong structure formed by a first register bank B1 and a second register bank B2. Each register file includes a plurality of registers.

Also, the PAC processor 10 comprises a third functional unit 40, which is placed independently and outside the first cluster 12A and the second cluster 12B. A third local register file 18 is connected to the third functional unit 40.

The first functional unit 20 is a load/store unit (M-Unit), the second functional unit 30 is an arithmetic unit (I-Unit), and the third functional unit 40 is a scalar unit (B-unit). The third functional unit 40 is in charge of branch operations and also capable of performing simple load/store and address arithmetic.

The global register files 22 are used to communicate across clusters 12A and 12B; only the third functional unit 40, being able to access all global register files 22, is capable of executing such copy operations across clusters 12A and 12B.

The first local register file 14, the second local register file 16, and the third local register file 18 are only accessible by the M-Unit 20, I-Unit 30, and B-Unit 40, respectively.

Each global register file 22 has only a single set of access ports, shared by the M-Unit 20 and I-Unit 30. Each register bank B1 or B2 of the global register file 22 can only be accessed by either the first functional unit 20 or the second functional unit 30 in an operation cycle, so these two functional units 20, 30 can only access different banks B1 or B2 in each operation cycle. This is an access constraint of the ping-pong structure.

Figure 2:
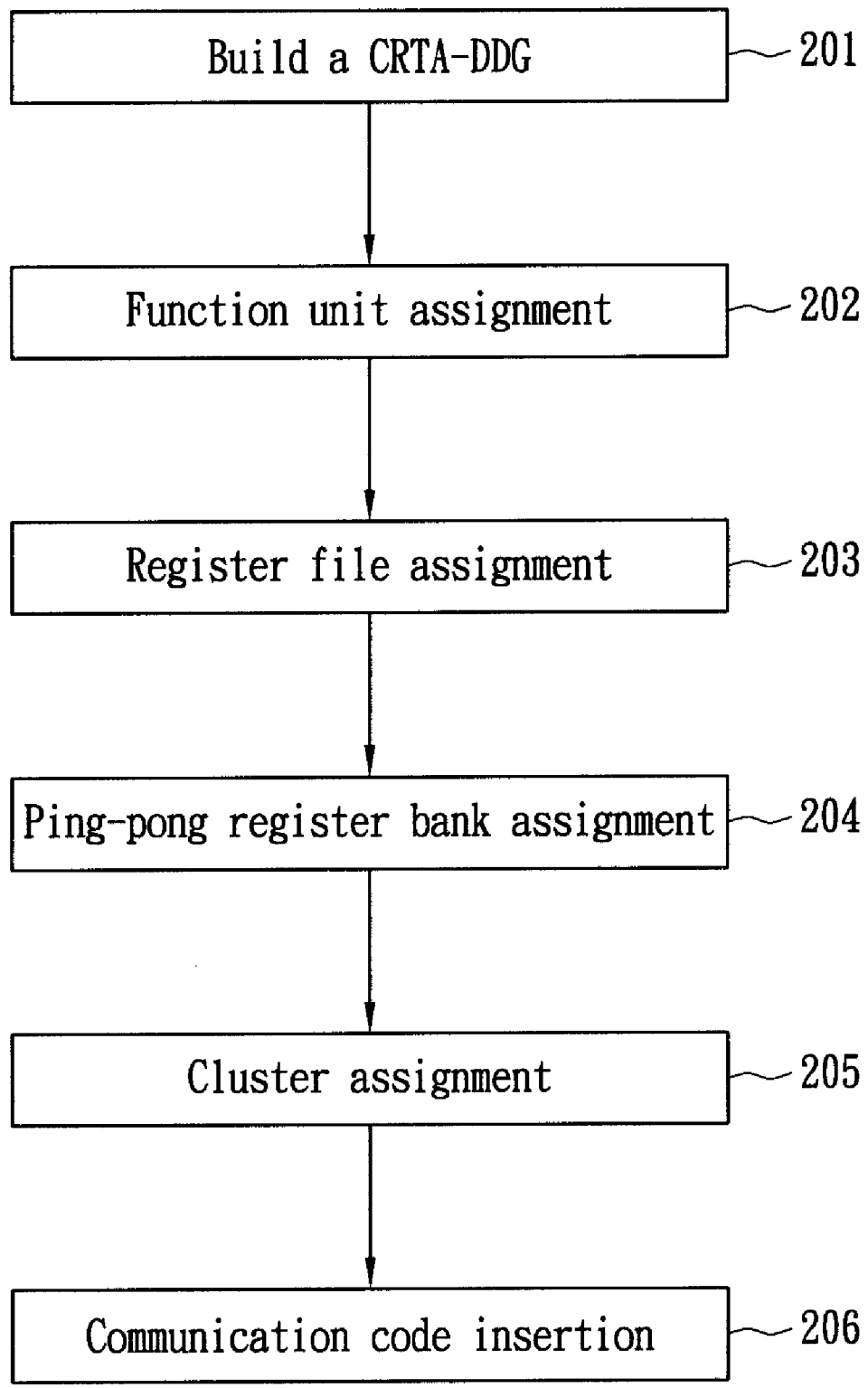
FIG. 2 is a schematic view of a flow chart illustrating the method for allocating registers according to one embodiment of the present invention.

FIG. 2 illustrates a flow chart of a method for allocating registers for the PAC processor 10 according to one embodiment of the present invention.

Referring to FIG. 2, the method for allocating registers requires building a Component/Register Type Associated Data Dependency Graph (CRTA-DDG) (step 201) first, which preserves the information of the execution and storage relationship for processor constraint analysis. The advantage of using the CRTA-DDG is that it clarifies the allocation and schedule restrictions for each node with the consideration of complex constraints in the PAC architecture.

Figure 3:
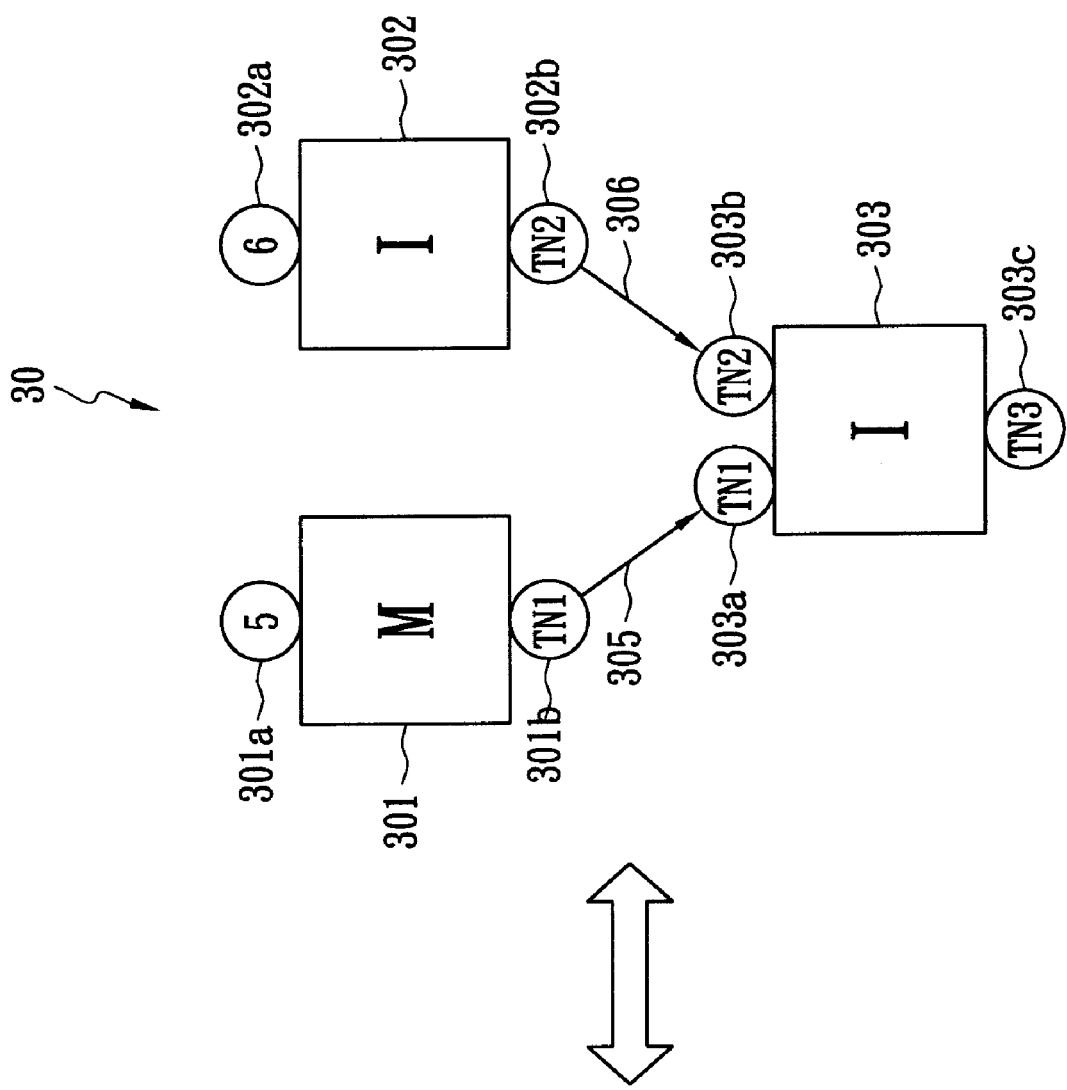
FIG. 3 shows a schematic view of an illustration of a CRTA-DDG built from an input program fragment.

FIG. 3 shows a CRTA-DDG 30 built from an input program fragment. The CRTA-DDG 30 comprises nodes, circles, and edges. Each rectangular node is labeled with its component-type association and represents an operator, whereas each circle is labeled with its register-type association and represents an operand. Each edge represents a data dependency between two operands.

The component-type association indicates which functional unit is scheduled for this node. The M-Unit is scheduled for a node 301 and the I-Unit is scheduled for nodes 302 and 303. The nodes 301, 302 and 303 represent operators of instruction 1 (movi), 2 (movi) and 3 (add), respectively.

The register-type association annotates the appreciated physical register file/bank to where the operands will be allocated. A Temporary Name (TN) represents a virtual register required to be allocated to a physical register in the machine-level intermediate representation used by Open Research Compiler (ORC). The operand is a constant or a virtual register. A circle 301a represents a constant 5 in the instruction 1. A circle 302a represents a constant 6 in the instruction 2. A circle 301b represents a virtual register TN1 in the instruction 1. A circle 302b represents a virtual register TN2 in the instruction 2. Circles 303a, 303b, and 303c represent virtual registers TN1, TN2, and TN3 in the instruction 3, respectively. Edge 305 linking the circles 301b, 303a and edge 306 linking the circles 302b, 303b represent data dependency that serializes the execution order to be followed in the scheduled code sequence.

FIGS. 4(a) through 4(l) illustrate the process for allocating registers according to one embodiment of the present invention.

Figure 4A:
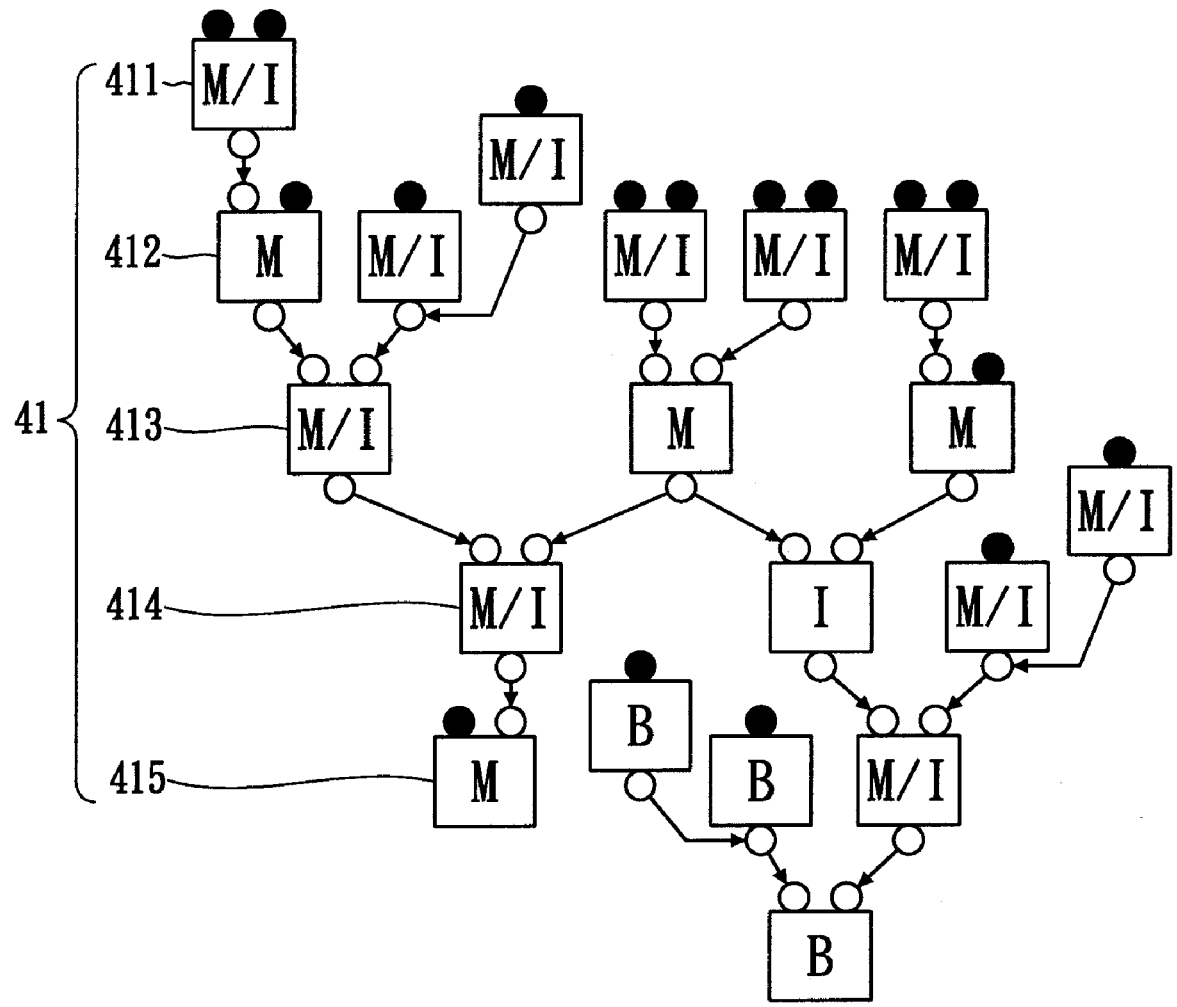
FIGS. 4(a) through 4(l) are schematic views illustrating the process of allocating registers according to one embodiment of the present invention.

FIG. 4(a) shows a CRTA-DDG built from an input program fragment. Nodes marked with M, I, B in the CRTA-DDG represent operators assigned to the M-Units, I-Units and B-Units, respectively. Nodes marked with M/I indicate that they are not assigned to the M-Units or I-Units yet. Black circles indicate virtual registers have been allocated to dedicated registers or constants, whereas white circles indicate virtual registers not allocated to register files yet.

Referring to FIG. 2, after building a CRTA-DDG (step 201), a functional unit assignment is performed for unassigned nodes on the CRTA-DDG (step 202) to determine which function units are assigned to execute the unassigned nodes.

FIGS. 4(b) through 4(g) illustrate the process of the step 202 performed on the CRTA-DDG. The main concept of the step 202 is performing a functional unit assignment that attempts to utilize as many local register files as possible, to distribute operations to the M-unit and I-unit, roughly in equal amounts, and to increase instruction level parallelism. Preferably, all nodes on a critical path, i.e., the path with the maximum number of nodes, in the graph operate on the same functional unit so that their operands can be stored on local register files. Therefore, the step 202 repeats the following process until all nodes in the CRTA-DDG are assigned with their own functional unit.

First, a longest data-flow path 41 comprising nodes 411, 412, 413, 414 and 415 is found in FIG. 4(a). The nodes 411, 413 and 414 operate either on the M-Unit or I-Unit, and function units are not assigned to nodes 413 and 414 yet. The nodes 413 and 414 are determined to be operated on the M-Unit, as shown in FIG. 4(b).

Figure 4B:
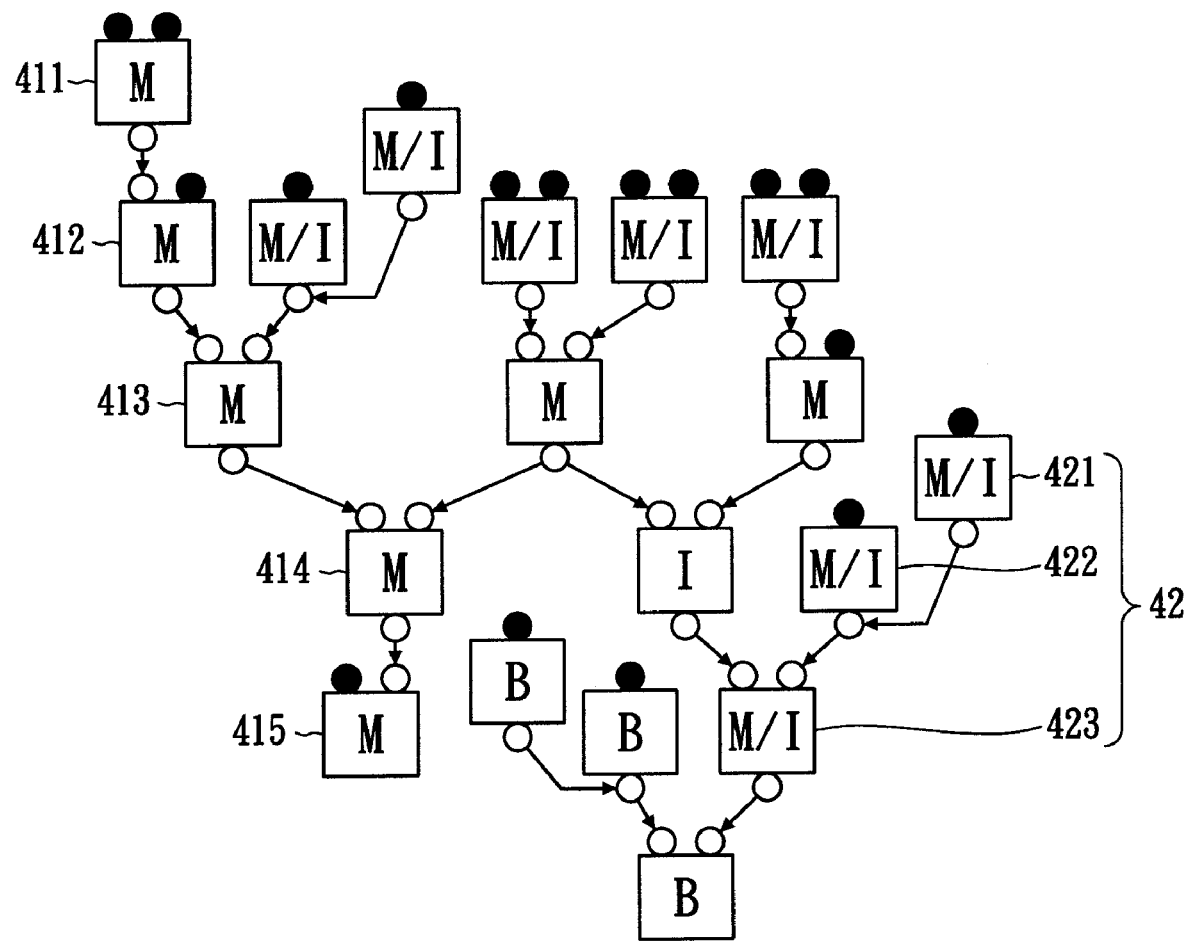

Then, except for the data-flow path 41, another longest data-flow path 42 is found in FIG. 4(b). The data-flow path 42 comprises nodes 421, 422, and 423, wherein the nodes 421, 422 and 423 can be operated either on the M-Unit or I-Unit, and its functional units are not assigned to the nodes 421, 422 and 423 yet. The nodes 421, 422 and 423 are determined to be operated on the I-Unit, as shown in FIG. 4(c).

Figure 4C:
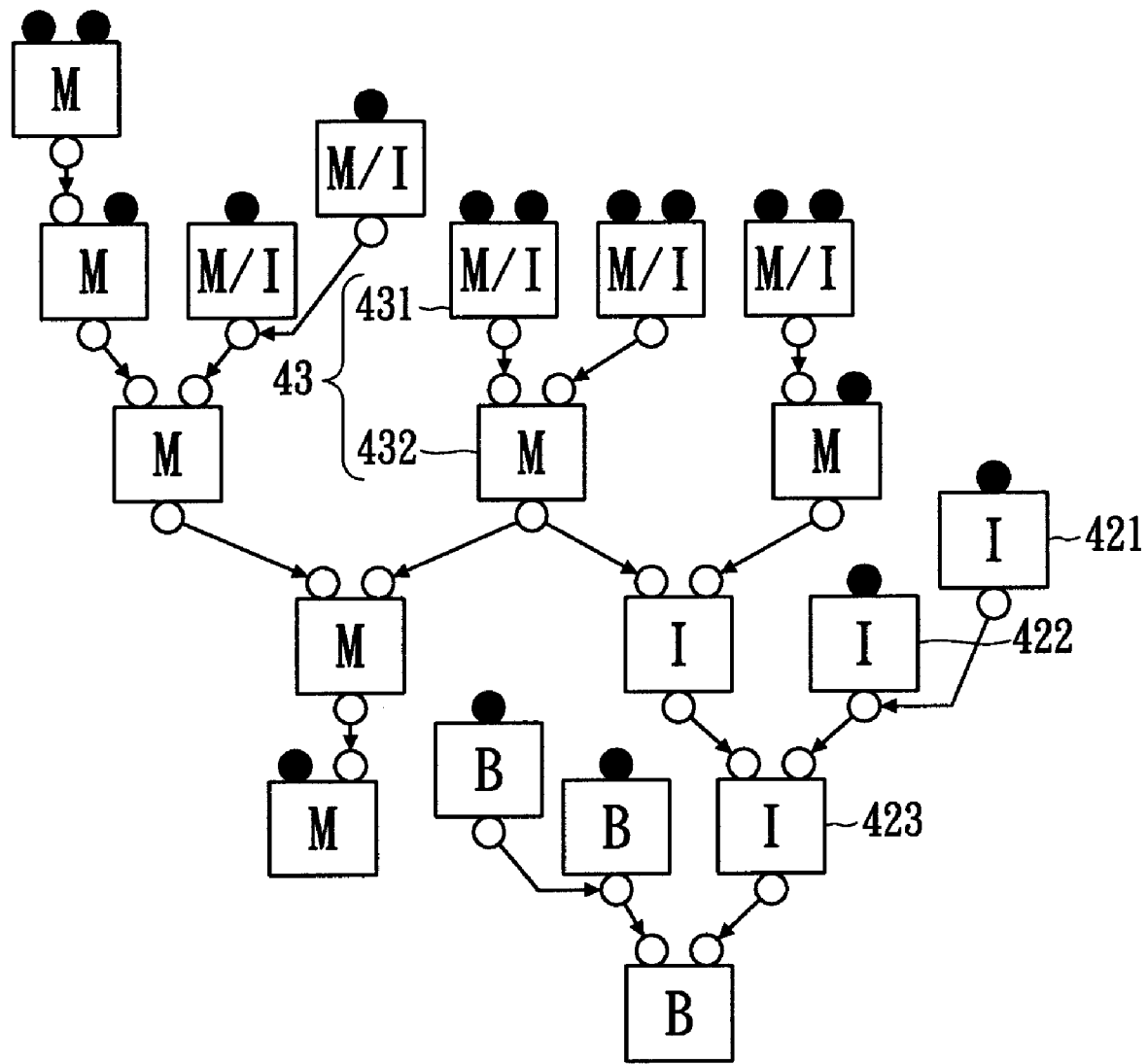

Except for the data-flow paths 41 and 42, another longest data-flow path 43 is found in FIG. 4(c). The data-flow path 43 comprises nodes 431 and 432, wherein the node 431 can be operated either on the M-Unit or I-Unit, and its functional unit is not assigned yet. The node 431 is determined to be operated on the M-Unit, as shown in FIG. 4(d).

Figure 4D:
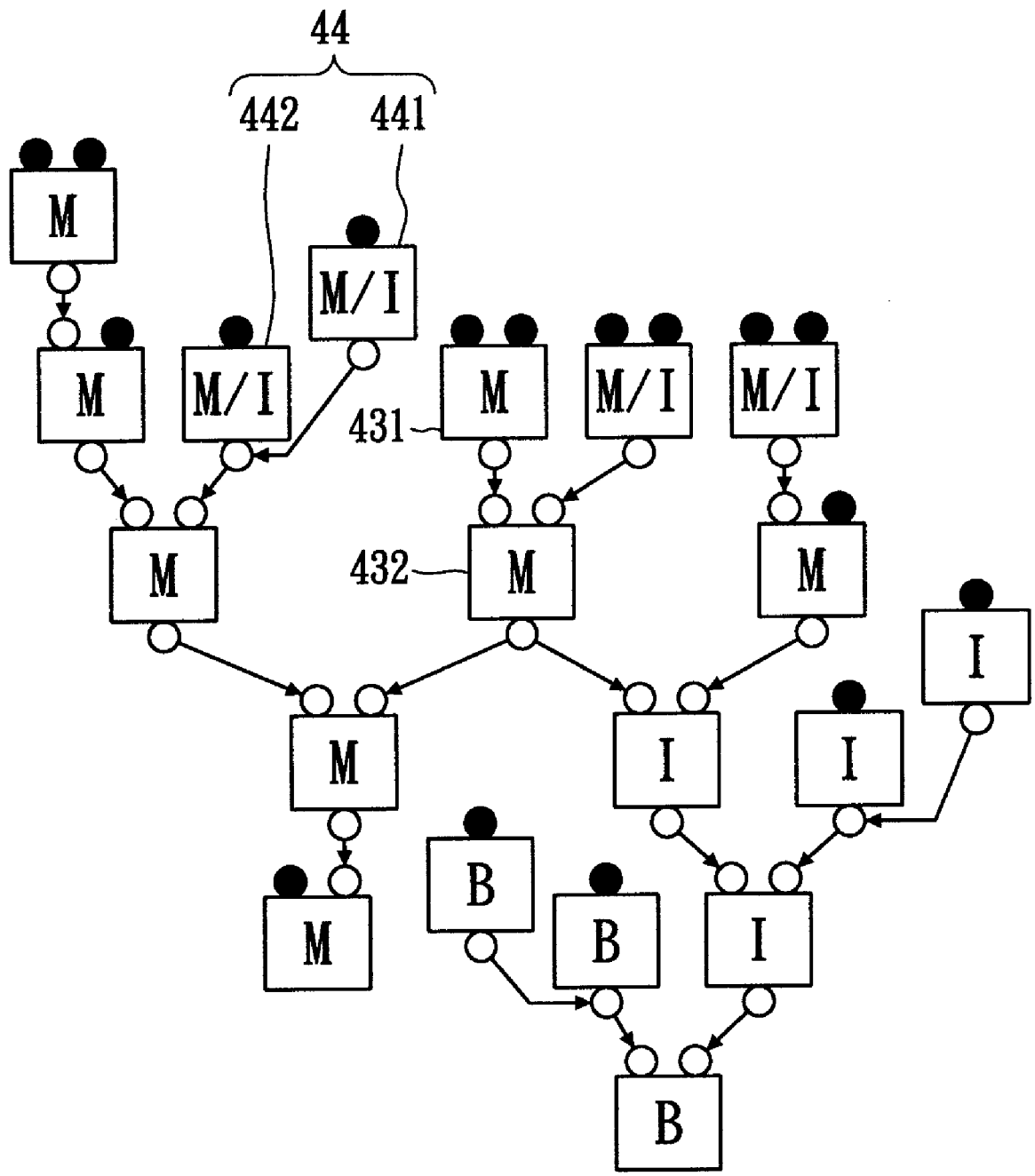

Likewise, another data-flow path 44 is found in FIG. 4(d). The data-flow path 44 comprises nodes 441 and 442, wherein the nodes 441 and 442 can be operated either on the M-Unit or I-Unit, and the functional units are not assigned to them yet. The nodes 441 and 442 are determined to be operated on the I-Unit, as shown in FIG. 4(e).

Figure 4E:
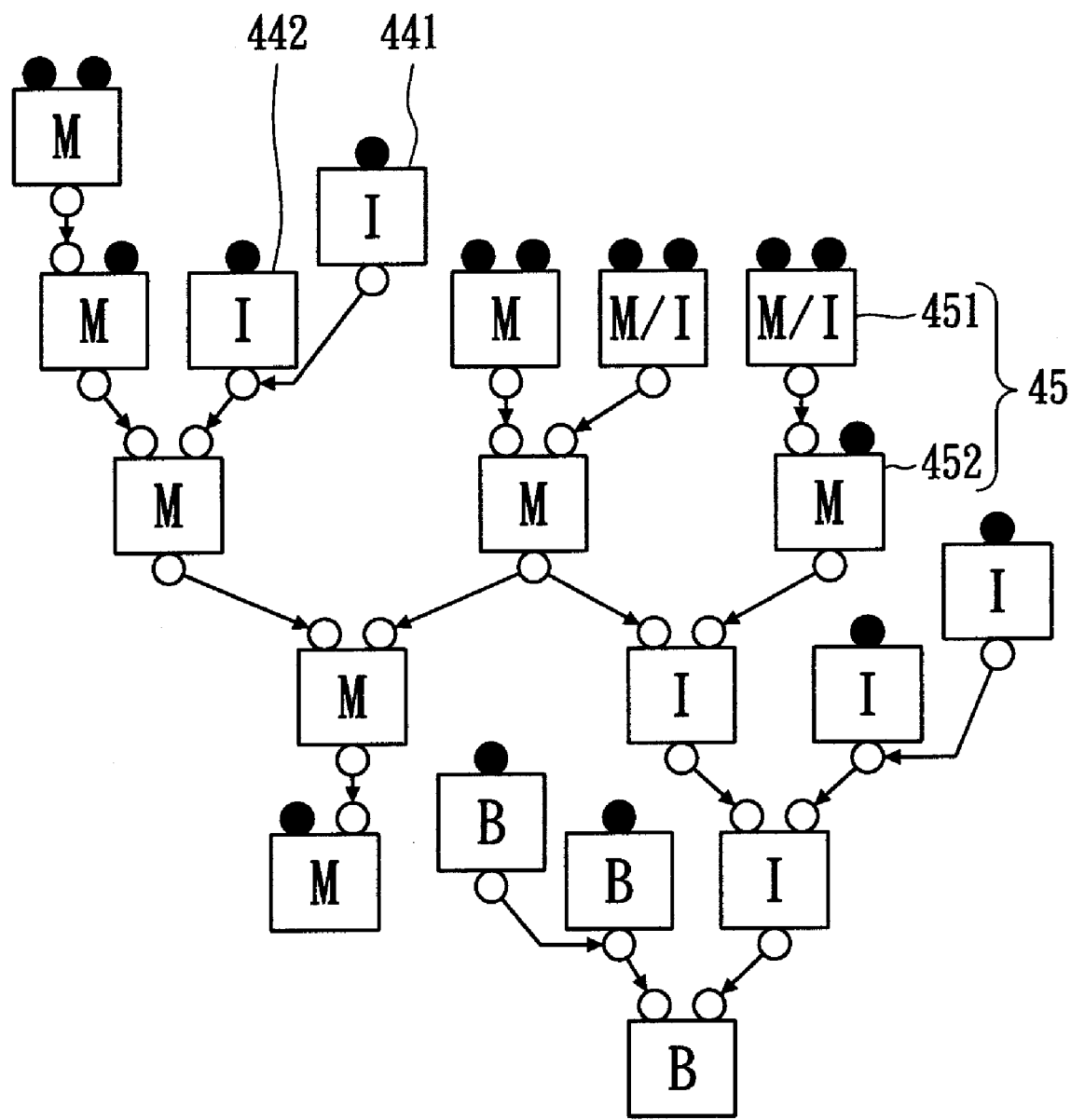

Moreover, another longest data-flow path 45 is found in FIG. 4(e). The data-flow path 45 comprises nodes 451 and 452, wherein the node 451 can be operated either on the M-Unit or I-Unit, and its functional unit is not assigned yet. The node 451 is determined to be operated on the M-Unit, as shown in FIG. 4(f).

Figure 4F:
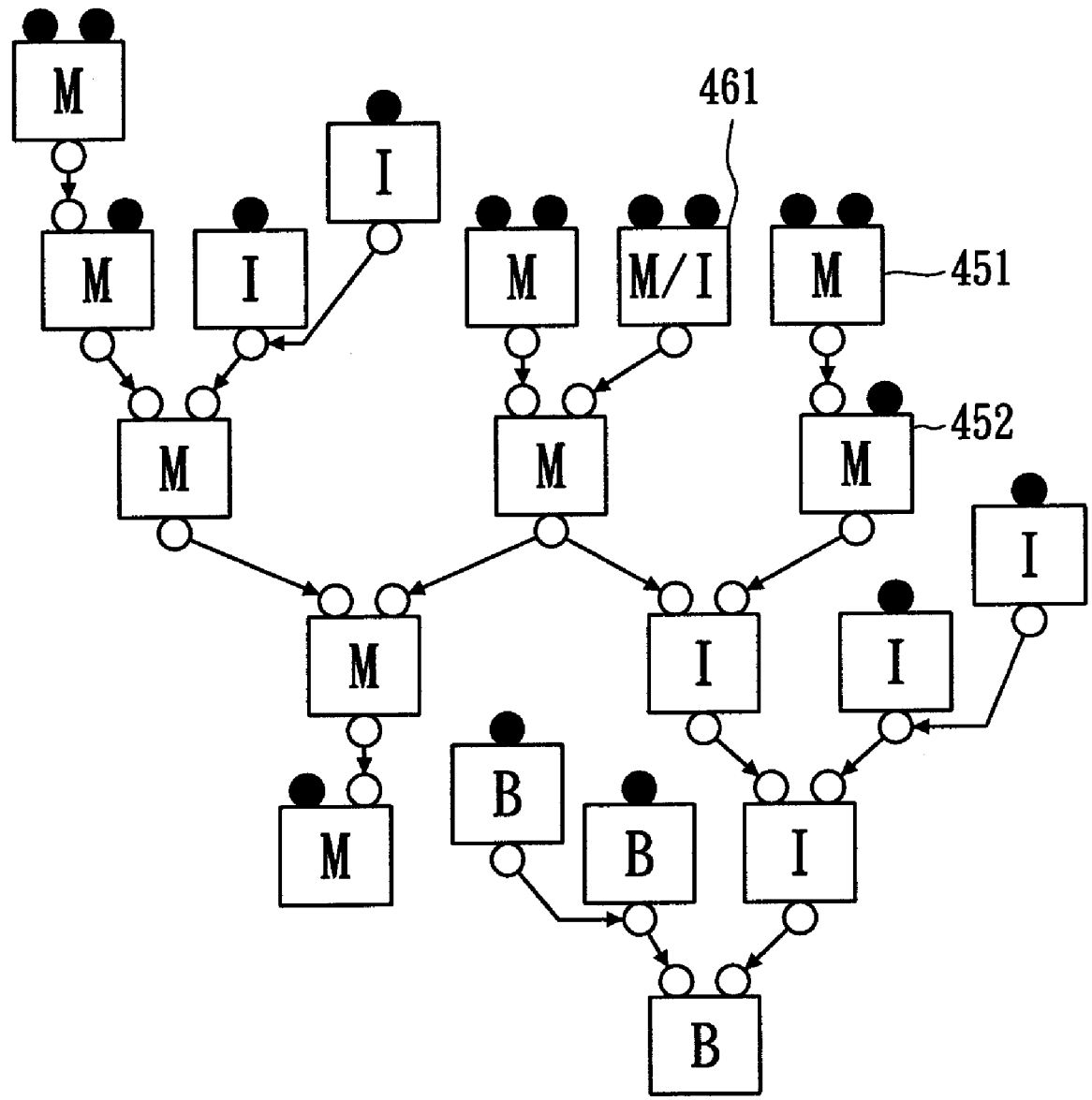
Figure 4G:
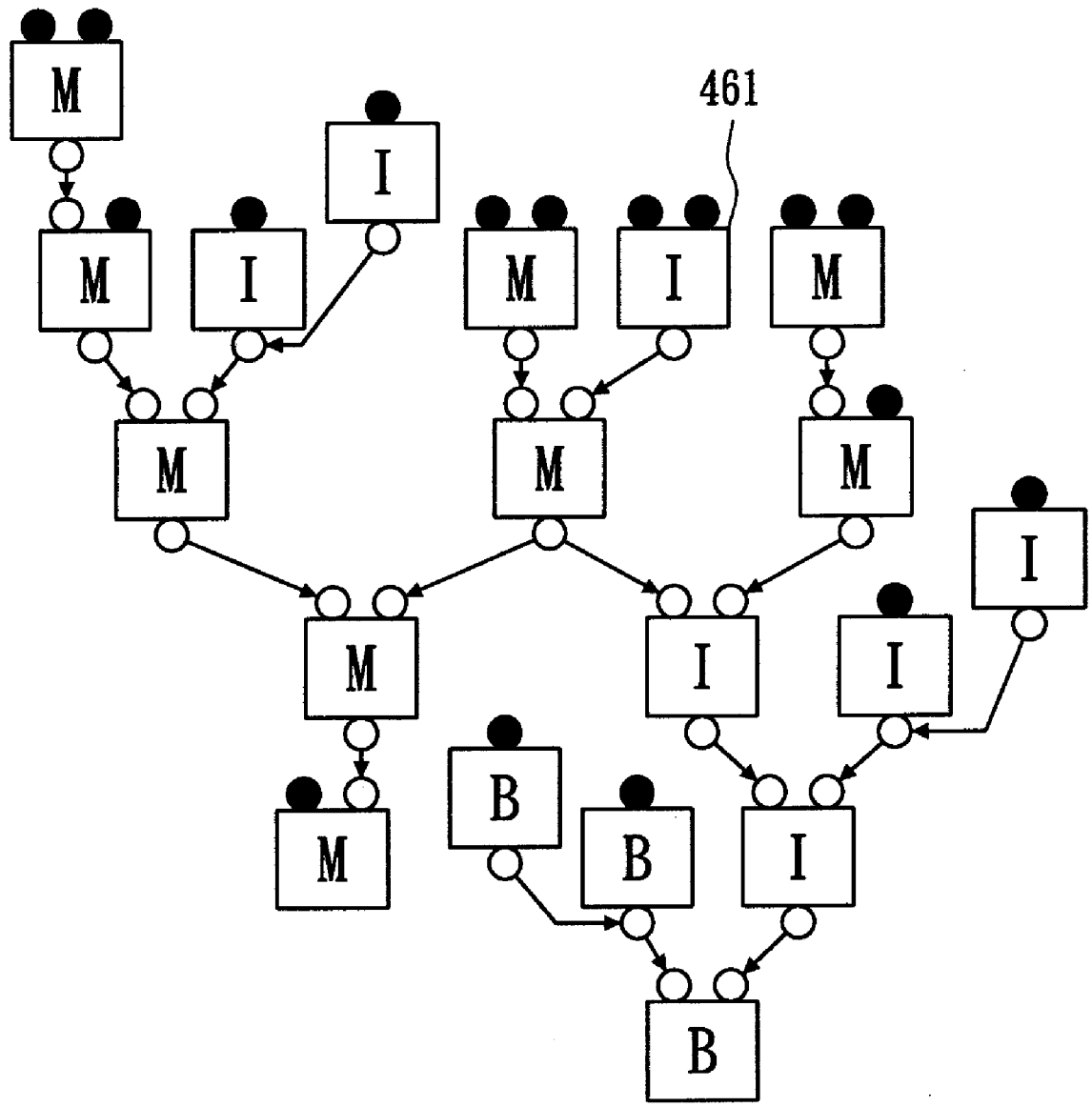

Finally, a node 461 whose functional unit is not assigned yet is found in FIG. 4(f), and the node 461 is determined to be operated on the I-Unit, as shown in FIG. 4(g).

Given the above, the functional unit assignment alternates between the M-unit and I-unit in each iteration so as to balance the amount of nodes of the M-unit and I-Unit.

After determining the functional unit type of all unassigned nodes (the step 202), a register file assignment for unallocated circles in the CRTA-DDG (step 203) is performed to determine which register files are allocated to the unallocated circles.

Figure 4H:
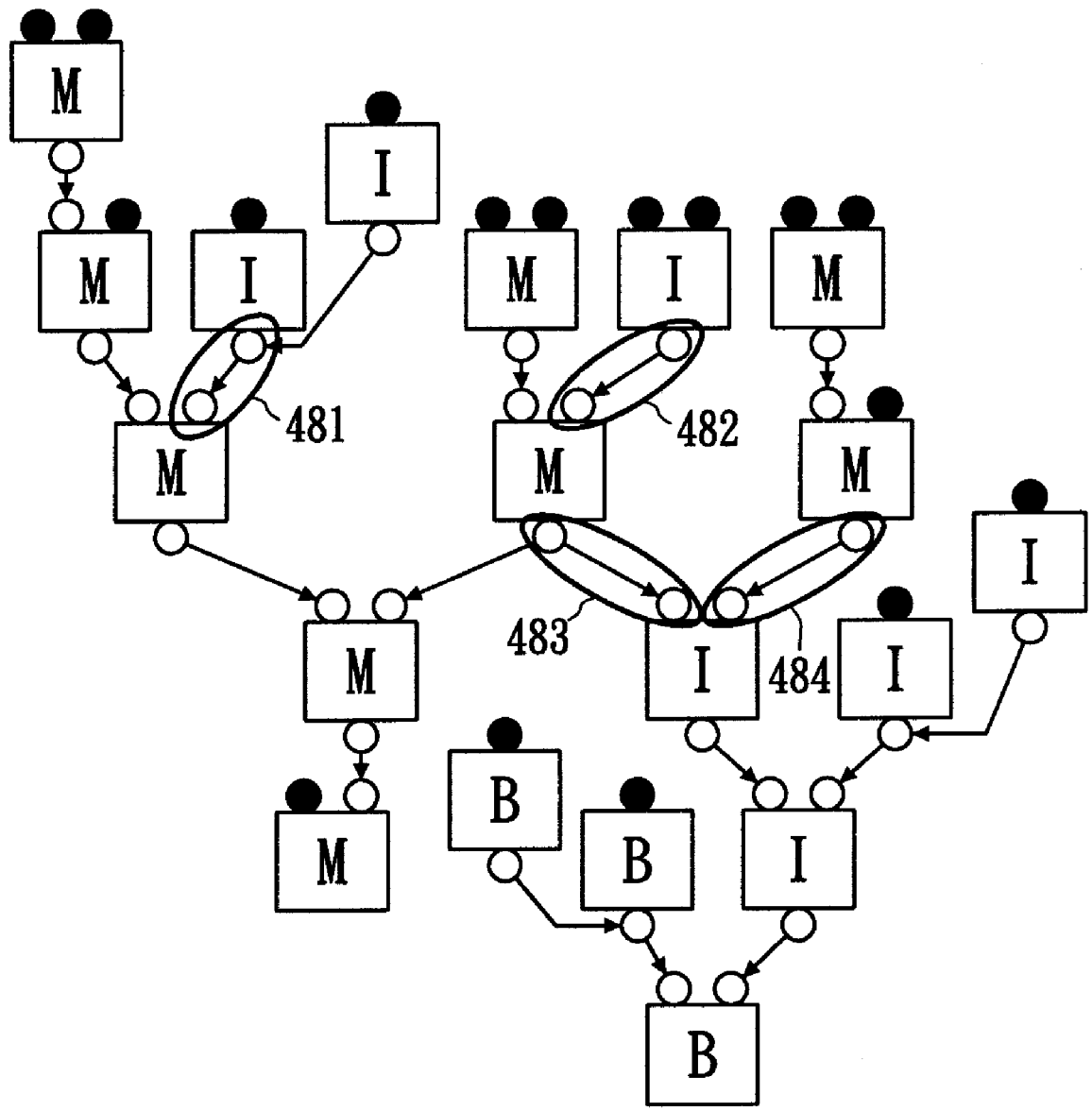

First, the global register file 22 is allocated to the virtual registers with data dependency across the M-Unit and I-Unit. This avoids unnecessary communication codes caused by data sharing between different functional units. FIG. 4(h) shows an example of a global register file assignment base in FIG. 4(g). The global register file 22 is allocated to the virtual registers on M-I pairs 481, 482, 483 and 484, and an M-I pair indicates that an M node links an I node through an edge and circles at the ends of the edge.

Then, the first local register file 14, the second local register 16, and the third local register file 18 are assigned to the other unassigned virtual registers with data dependency across the M-Unit and M-Unit, I-Unit and I-Unit, and B-Unit and B-Unit, respectively.

After performing register file assignment for the unallocated circles (the step 203), a ping-pong register bank assignment (step 204) is performed.

Figure 4I:
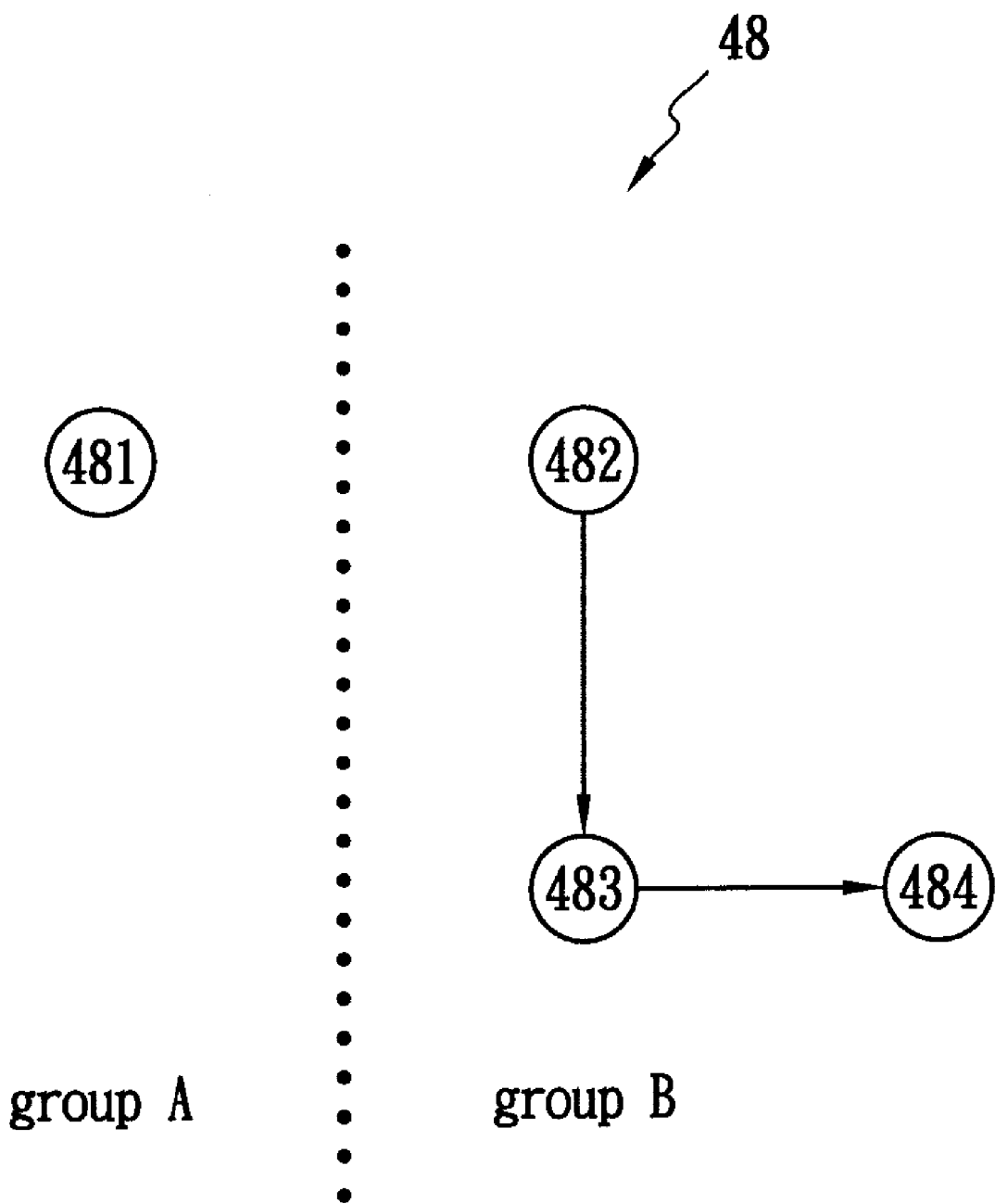

First, an inverse graph is built based on the M-I pairs with their related virtual registers that are allocated to global register files in the step 202. Referring to FIG. 4(i), an inverse graph 48 is built based on FIG. 4(h) by converting vertices (nodes on the M-I pairs) to edges, and converting edges on the M-I pairs to vertices.

Then, vertices on the graph 48 are partitioned into two balanced groups with minimal cuts. In this case, the vertices are partitioned into group A and group B with one cut (dotted line).

Finally, virtual registers on group A and group B are allocated to the first register bank B1 and the second register bank B2, respectively.

Figure 4J:
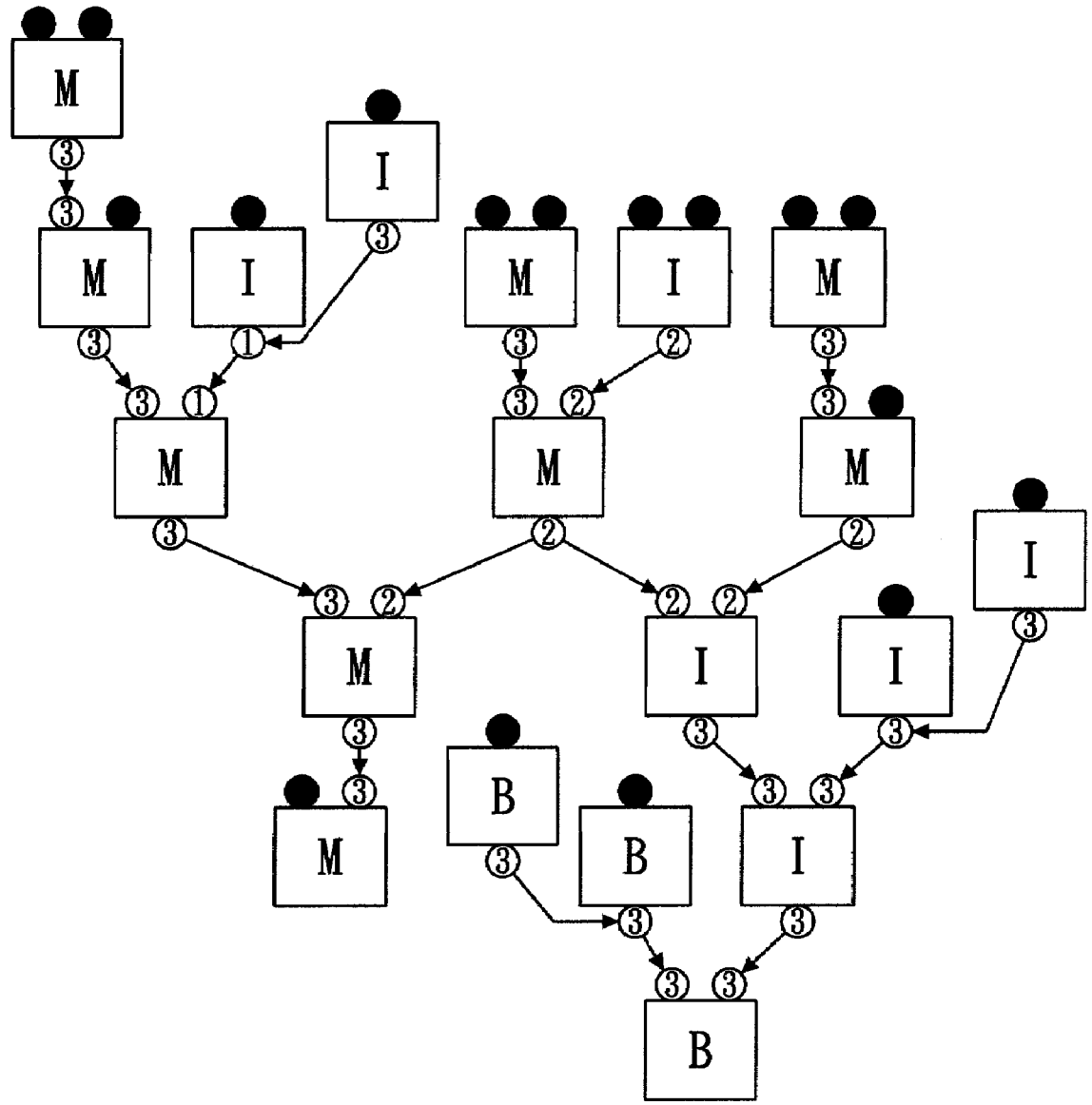

FIG. 4(j) shows the results of the register file and ping-pong register bank assignments. Virtual registers (circles) marked with 1, 2, and 3 are allocated to the first register bank B1, the second register bank, and the corresponding local register files of the functional units, respectively.

After step 204 of ping-pong register bank assignment, an optional step 205 for cluster assignment is performed to take advantages of the two-cluster property of PAC DSP. The step 205 is to partition all nodes of the M-Unit and I-Unit into two groups based on the whole graph without nodes assigned to the B-Unit.

Figure 4K:
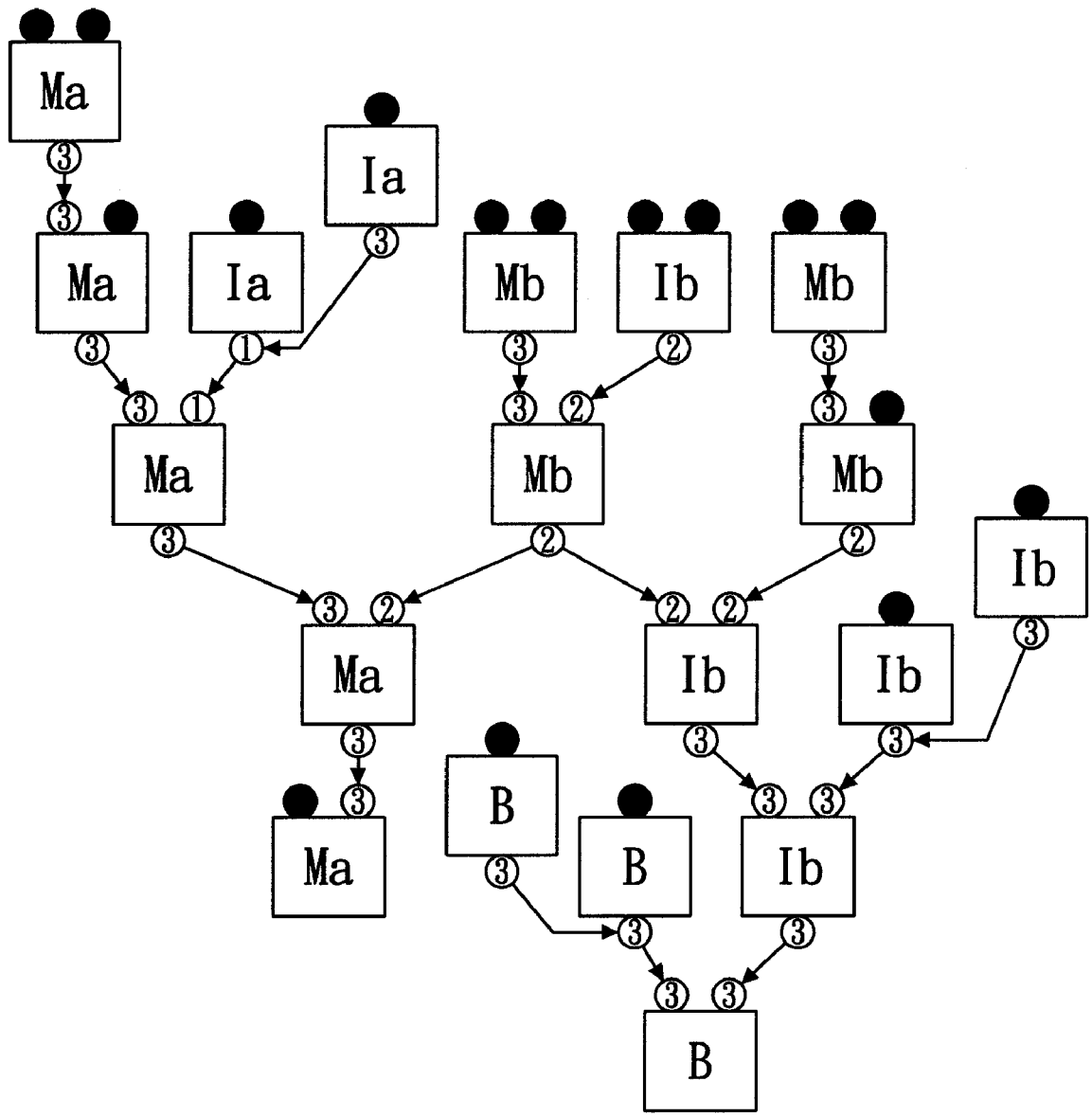
Figure 4:
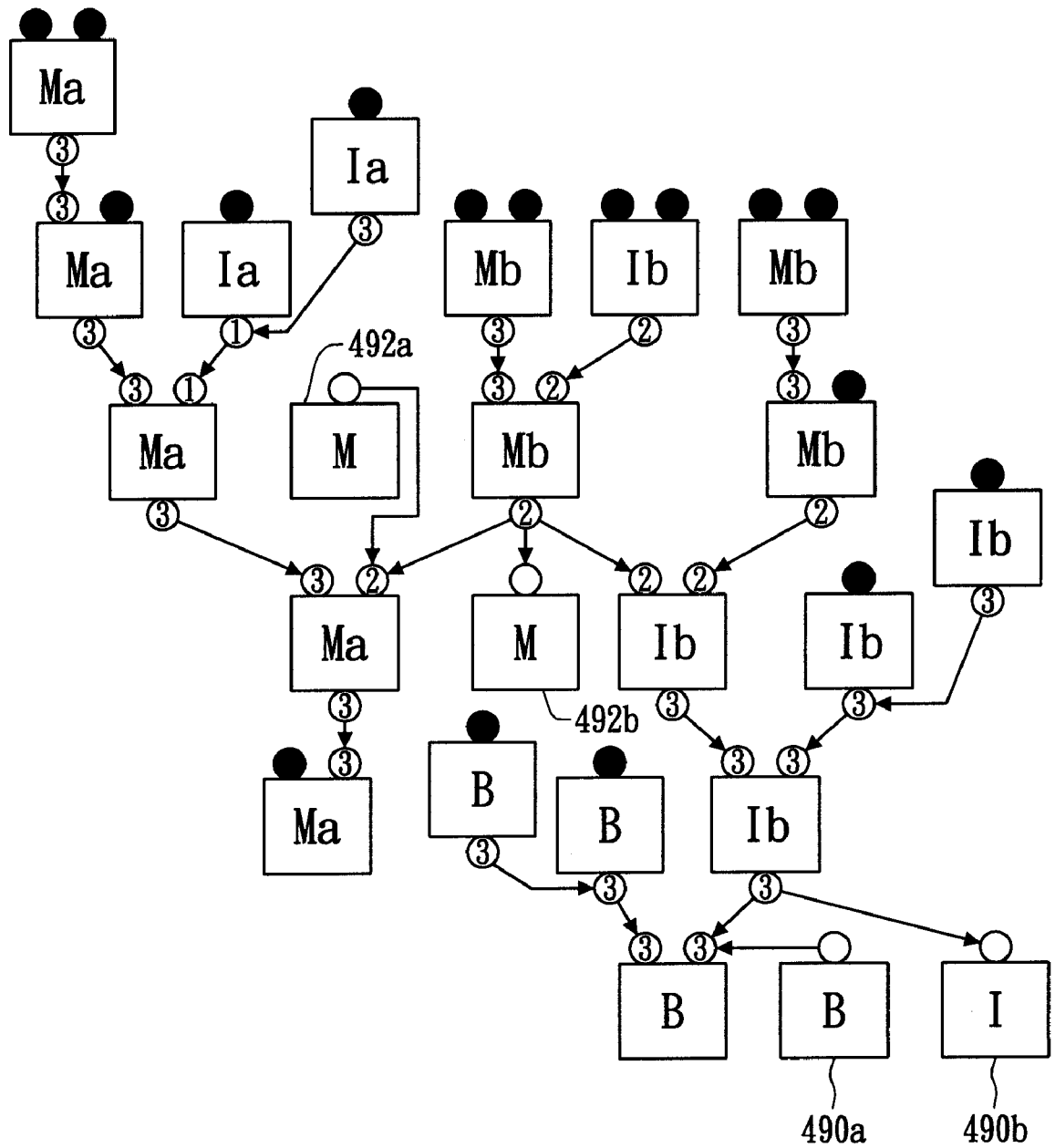

FIG. 4(k) shows the result of the cluster assignment based on FIG. 4(j). Nodes marked with Ma and Ia are assigned to the cluster 12A, whereas nodes marked with Mb and Ib are assigned to the cluster 12B.

The last step before real register allocation is communication code insertion (step 206). FIG. 4(l) shows the result of the communication code insertion based on FIG. 4(k). In the PAC scheme, communication code insertion is performed in the following situations to make the operation work.

When a B node is linked to an M node or an I node, another B node (490a) and another I node (490b) are inserted for the communication because B node can only use its own third local register file 18.

When a possible communication is generated by the cluster assignment step 205, a communication link is generated between the first cluster 12A and the second cluster 12B. M nodes (492a and 492b) are inserted for the inter-cluster communication.

Another case may occur in the ping-pong bank assignment (the step 204) while cutting on an edge of the inverse graph, which means a node simultaneously accesses two banks of the global register file. Therefore, an additional node is needed to be inserted to copy data from one register bank of the global register file to the local register file so as to make the operation work.

The functional unit assignment, the register file assignment, the ping-pong register bank assignment, and the cluster assignment of the invention are performed to take full advantage of the properties of a PAC processor, so as to obtain a good performance of allocating registers.

The above-described embodiments of the present invention are intended to be illustrative only. Numerous alternative embodiments may be devised by those skilled in the art without departing from the scope of the following claims.

We claim:

1. A method for allocating registers for a processor, said processor comprising a first cluster and a second cluster, each cluster comprising a first functional unit, a second functional unit, a first local register file connected to said first functional unit, a second local register file connected to said second functional unit, and a global register file having a ping-pong structure formed by a first register bank and a second register bank, said global register file being connected to the first and second functional units, said method comprising steps of:

(a) building a graph comprising nodes, circles and first edges, wherein each node is labeled with at least one of said first functional unit and said second functional unit, each circle indicating whether the register is allocated, each first edge being connected between two of the circles indicating data dependency therebetween;

(b) allocating one of the first and second functional units to the nodes labeled with the first and second functional units concurrently in said graph;

(c) allocating the first, second and global register files to unallocated circles based on the corresponding nodes of the unallocated circles allocated by the first functional unit or the second functional unit;

(d) allocating said first register bank and said second register bank to the circles allocated to the global register file based on whether the circles allocated to the global register file are linked through only one node in the graph; and (e) adding at least one node to communicate between the first cluster and the second cluster or between the global register file and the first and second local register files.

2. The method for allocating registers of claim 1, further comprising a step of:
partitioning the nodes of the first functional unit and the second functional unit into a first group assigned to the first cluster and a second group assigned to the second cluster.

3. The method for allocating registers of claim 1, wherein the step (b) comprises steps of:

(b1) finding a first data-flow path having a largest number of nodes and determining the nodes on the first data path to be of the first functional unit; and (b2) finding a second data-flow path whose number of nodes is equal to or less than the number of the nodes on the first data-flow path, and determining the nodes on the second data-flow path to be of the second functional unit;

wherein the steps (b1) and (b2) are repeated for the undetermined nodes.

4. The method for allocating registers of claim 1, wherein the step (c) comprises steps of:

(c1) allocating the global register file to the unallocated circles with the first edges linking the nodes of the first functional unit and the nodes of the second functional unit;

(c2) allocating the first local register file to the unallocated circles with the first edges linking the nodes of the first functional unit; and (c3) allocating the second local register file to the unallocated circles with the first edges linking the nodes of the second functional unit.

5. The method for allocating registers of claim 4, wherein said processor further comprises a third functional unit connected between the first cluster and the second cluster, and a third local register file connected to the third functional unit, the step (c) further comprising a step of:
allocating the third local register file to the unallocated circles with the first edges linking the nodes of the third functional unit.

6. The method for allocating registers of claim 4, wherein the step (d) comprises steps of:

(d1) building an inverse graph comprising vertices and second edges connecting the vertices for the circles allocated to the global register file in the step (c1), each vertex being converted from a combination of two of the circles and the first edge connected therebetween, the nodes corresponding to the two circles being of different functional units, and each second edge being converted from the node between two of the combinations;

(d2) partitioning the inverse graph into a first group and a second group with a minimal number of cuts; and (d3) respectively allocating the first and second register banks to the circles corresponding to the first and second groups.

7. The method for allocating registers of claim 1, wherein the step (e) is comprised of:

further inserting one node on the graph to copy data from the first or second register bank to the first or second local register file.

8. The method for allocating registers of claim 1, wherein the step (e) is comprised of:

further inserting a pair of nodes on the graph for communication between the first cluster and the second cluster.

9. The method for allocating registers of claim 1, wherein said processor further comprises a third functional unit connected between the first cluster and second cluster, and a first node allocated to the third functional unit links to a second node allocated to the first or the second functional unit, the step (e) being comprised of:

further inserting a third node of the third functional unit and a fourth node of the same functional unit as the second node on the graph for communication.

10. The method for allocating registers of claim 1, wherein the first functional unit is a load/store unit.

11. The method for allocating registers of claim 1, wherein the second functional unit is an arithmetic unit.

12. The method for allocating registers of claim 5, wherein the third functional unit is a scalar unit.

13. The method for allocating registers of claim 1, wherein the global register file comprises one single set of access ports shared by the first and second functional units that can only access different register banks in each operation cycle.

14. The method for allocating registers of claim 1, wherein each node represents an operator, each circle represents an operand, the operand is a constant or a virtual register required to be allocated to a physical register in the machine level, and each edge represents a data dependency between two of the operands.

* * * * *

UNITED STATES PATENT AND TRADEMARK OFFICE
CERTIFICATE OF CORRECTION

PATENT NO. : 7,650,598 B2 Page 1 of 1
APPLICATION NO. : 11/463538
DATED : January 19, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Twenty-third Day of November, 2010

David J. Kappos
*Director of the United States Patent and Trademark Office*